United States Patent [19]

Frey et al.

[11] Patent Number: 4,556,117
[45] Date of Patent: Dec. 3, 1985

[54] FREE FLOATING OPERATOR COMPARTMENT

[75] Inventors: G. Robert Frey; Gregory M. Chandler, both of Franklin; Richard A. King, Emlenton, all of Pa.

[73] Assignee: Joy Manufacturing Company, Pittsburgh, Pa.

[21] Appl. No.: 652,424

[22] Filed: Sep. 20, 1984

Related U.S. Application Data

[63] Continuation of Ser. No. 437,972, Nov. 1, 1982, abandoned.

[51] Int. Cl.⁴ .............................................. B62D 33/06
[52] U.S. Cl. .................... 180/89.13; 296/190; 405/303
[58] Field of Search .................. 180/89.13, 89.15, 89.1, 180/190, 317, 326; 296/190; 405/303

[56] References Cited

U.S. PATENT DOCUMENTS

| | | | |
|---|---|---|---|
| 3,675,966 | 7/1972 | Luft | 180/89.13 X |
| 3,885,643 | 5/1975 | Goodbary | 180/89.13 |
| 4,018,473 | 4/1977 | Chalupsky | 296/190 |
| 4,078,629 | 3/1978 | Kutay et al. | 180/89.13 |
| 4,146,106 | 3/1979 | Childress | 180/317 |
| 4,157,878 | 6/1979 | Jamison | 405/303 |

Primary Examiner—Joseph F. Peters, Jr.
Assistant Examiner—Mitchell J. Hill
Attorney, Agent, or Firm—Raymond W. Augustin

[57] ABSTRACT

A suspension system for an operator's compartment of a mine vehicle is set forth. The mine vehicle is of a type that has a body and operator's compartment positioned adjacent to the body. A guide is attached to the body of the vehicle and a rail is attached to the operator's compartment. This guide and rail arrangement slidably connects the operator's compartment to the body. The guide and rail are arranged to permit the operator's compartment to independently move upward and down in relation to the body. The rail is located in a central portion of the operator's compartment to minimize the angular displacement of the rail with respect to the guide upon rotation of the operator's compartment. This ensures free upward and downward motion of the operator's compartment with respect to the body of the vehicle.

6 Claims, 6 Drawing Figures

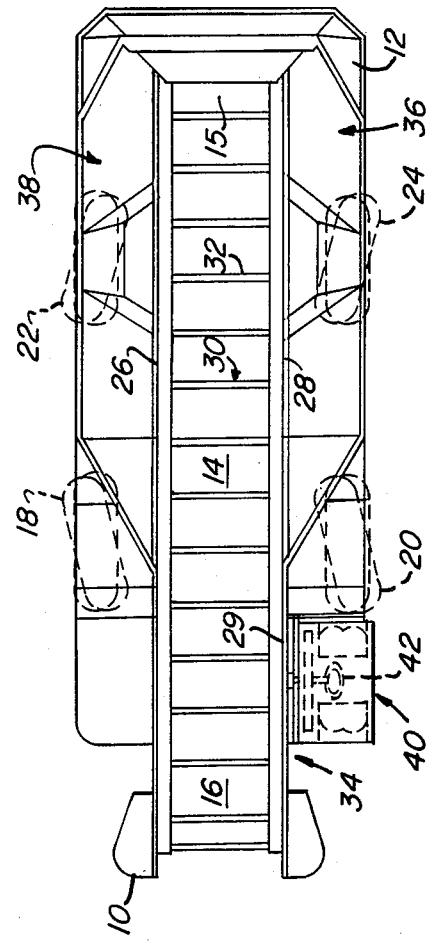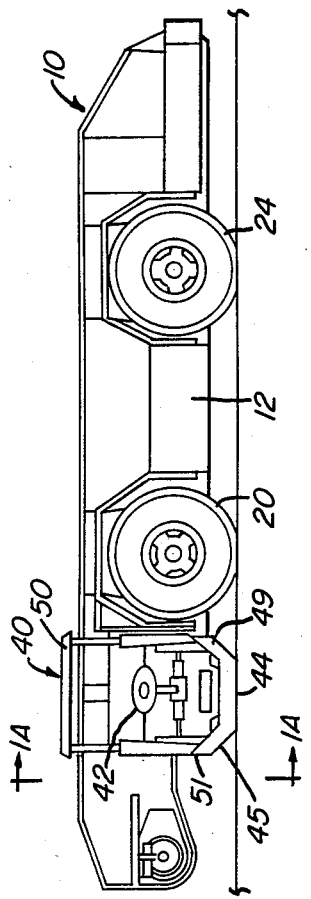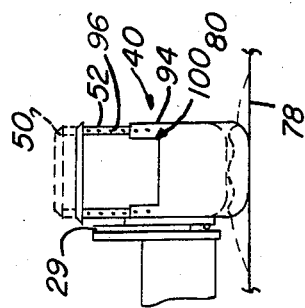

FREE FLOATING OPERATOR COMPARTMENT

This application is a continuation of application Ser. No. 437,972 filed Nov. 11, 1982 now abandoned.

BACKGROUND OF THE INVENTION

1. Field of the Invention

This invention relates to an operator's compartment that is supported for independent up and down movement on the side wall of a self-propelled mine vehicle, and more particularly to an operator's compartment arranged to move upwardly and downwardly independently of the up and down movement of the vehicle as the mine vehicle moves over the uneven surface of the mine floor.

2. Description of the Prior Art

Self-propelled haulage vehicles, such as shuttle cars, are used in mines for transporting dislodged material from a mining or loading machine out of the mine. The shuttle car includes a longitudinally extending compartment in which the mined material is loaded, and after loading the shuttle car moves from an area adjacent the mine face to a fixed haulage system where the coal is discharged from the shuttle car onto a conveyor belt.

The shuttle car is controlled from an operator's compartment that is rigidly secured to the side wall of the vehicle. Suitable controls are provided on the operator's compartment by which the operator controls the movement of the vehicle between the mine face and the discharge point and also operates the conveyor of the haulage compartment.

The machine operator in the operator's compartment is exposed to the mine roof and is, therefore, subject to serious injury from falling debris. It is known to utilize overhead canopies for protecting operators of various equipment in a mine from the hazard of roof falls. For a shuttle car, however, the limited overhead clearance above the operator's compartment does not permit installation of a canopy particuarly when the car operates in mine seam heights of less than 40 inches. With the operator's compartment fixed on the vehicle and raised above the mine floor to provide the necessary ground clearance between the bottom of the compartment and the mine floor, there is insufficient clearance above the top of the shuttle car for the installation of an overhead protective canopy. Also, where there is little clearance between the top of the canopy and the mine roof, the canopy will strike the mine roof as the shuttle car bounces when it moves over the uneven undulating mine floor.

U.S. Pat. No. 4,078,629 discloses a mine vehicle having an operator's compartment slidably attached thereto. The connecting method disclosed in U.S. Pat. No. 4,078,629 utilizes two guide rails located at either end of the operator's compartment mating with two guide tracks on the vehicle. If the compartment is slightly cocked then the guide rail/tracks of the operator's compartment tend to bind and jam. The cocking also causes galling to occur along the guide track surfaces.

Usually the binding or jamming problem occurs when the compartment is falling after hitting a bump. When the compartment falls after having encountered a bump the only downward force is the weight of the compartment. If two slide mechanisms or guide and rail combinations are utilized and if the cab is slightly cocked (due to manufacturing tolerances) one rail will contact its guide before the other. This side will have to support all of the weight of the platform and, because of the leverage generated between the central point where the weight is acting, the rail/guide combination forces generated are enough to cause the one contacting rail to bind in the guide. In other words, the friction force between the rail and the guide resulting from the reactant force (weight to distance from center to guide) between the rail and the guide is greater than the weight of the operator's compartment so that it cannot drop.

It has been found that by utilizing a single guide/rail arrangement at the center of the cab that the moment arm is reduced so that the weight on each side of the rail is approximately equal and there is very little reactant force developed between the rail and the guide. Since the reactant force is low the friction forces which prevent falling are also low and the operator's compartment weight is enough to allow it to drop as desired.

SUMMARY OF THE INVENTION

In accordance with the present invention there is provided a self-propelled vehicle for use in a mine that includes a mobile body portion and ground traction means for supporting the mobile portion for movement in the mine. An operator's compartment is positioned adjacent the vehicle body portion. A connecting assembly supports the operator's compartment for independent upward and downward movement of the operator's compartment on the vehicle body portion so that the operator's compartment is free to move independently of the mobile body as the mobile body moves over the irregular contour of the mine floor.

The operator's compartment includes a protecting canopy that is secured to the body portion of the compartment and serves to protect the operator from solid material dislodging from the mine roof. By supporting the operator's compartment for movement on the body portion of the vehicle, the bottom portion of the compartment remains in contact with the mine floor and thus provides additional overhead clearance for the installation of the protective canopy. With the additional overhead clearance, the top surface of the protective canopy remains displaced from contact with the mine roof as the vehicle travels over the uneven and undulating mine floor. The canopy is supported by vertical members that are secured to the body portion of the compartment to permit vertical adjustment of the position of the canopy relative to the top of the vehicle side wall. Thus, the canopy may be raised or lowered on the compartment as necessitated by the clearance between the top of the vehicle side wall and the mine roof.

The connecting mechanism includes a vertically positioned, generally T-shaped guide rail which is centrally located with respect to the operator's compartment. The guide rail is secured to the side wall of the operator's compartment at the center thereof and is slidably received within vertical guide track of a member that is rigidly secured to the vehicle. The guide track includes recessed portions having a configuration of the T-shaped guide rail so that the guide rail is retained with the recessed portions for vertical movement as the bottom portion of the compartment follows the uneven contour of the mine floor. The use of a single load carrying track or guide which by virtue of being located at the center of the operator's compartment and coupled with appropriate clearances between the T-shaped connecting rail and the guide on the vehicle minimizes the tendency to bind, gall or twist when the operator's compartment is subjected to external laods. This allows the operator's platform to move or float up or down in the vertical direction as the contour of the mine floor varies.

Auxiliary and safety brackets are provided to ensure that, in the event of failure of the main center support the platform will not come apart from the vehicle body.

A stop mechanism comprising coacting members on the operator's compartment and guide wall serve to prevent the guide rail from sliding out of the guideway, particularly when the operator's compartment moves downwardly relative to the vehicle because of a recess in the mine floor.

The bottom portion of the operator's compartment rests on the mine floor as the vehicle moves over the undulations of the mine floor. The vertical position of the operator's compartment on the vehicle varies as the vehicle moves over the uneven contour of the mine floor. The stop mechanism limits the downward movement of the compartment when the vehicle moves over severe depressions in the mine floor. With this arrangement of supporting the compartment for vertical movement on the vehicle clearance is provided for installation of the protective canopy above the compartment. The canopy remains spaced from the mine roof as the operator's compartment moves upwardly and downwardly on the body portion of the vehicle.

Accordingly, the principle object of the present invention is to provide an operator's compartment for a self-propelled mine vehicle in which the operator's compartment is movably supported on the body portion of the vehicle such that when the vehicle moves over the uneven surface of the mine floor, the entire compartment follows the contour of the mine floor.

Another object of the present invention is to provide an operator's compartment that is independently movable relative to the side wall of a self-propelled vehicle so that the bottom portion of the compartment slides on the uneven surface of the mine floor to provide additional overhead clearnace for the installation of a protective canopy on the operator's compartment and permit operation of the vehicle in mineral seams of low height.

These and other objects of the present invention will be more completely disclosed and described in the following specification, the accompanying drawings and the appended claims.

BRIEF DESCRIPTION OF THE DRAWINGS

FIG. 1 is a view in side elevation of a mine shuttle car, illustrating a protected operator's compartment movably supported on the body portion of the shuttle car.

FIG. 1A is a fragmentary view in end elevation taken along line 1A—1A' of FIG. 1, illustrating by the dotted lines the vertical movement of the operator's compartment as the compartment slides on the surface of the mine floor upon movement of the shuttle car.

FIG. 2 is a top plan view of FIG. 1.

DESCRIPTION OF THE PREFERRED EMBODIMENT

Figure 3:
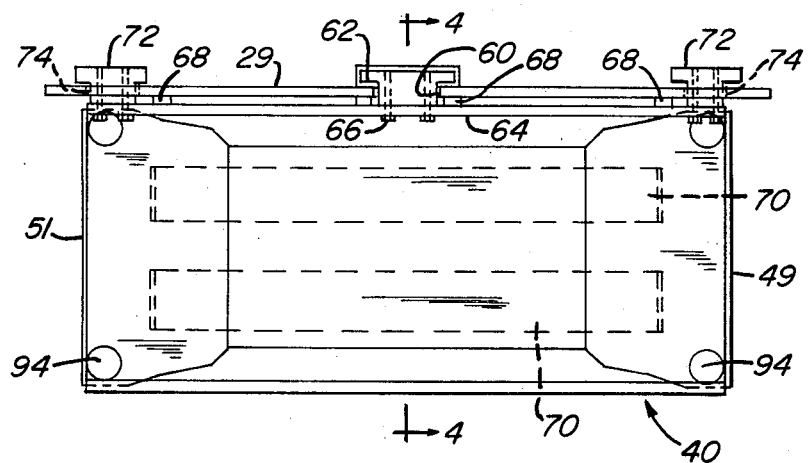
FIG. 3 is an enlarged fragmentary top plan view partially in section of the connection of the operator's compartment to the body portion of the shuttle car, illustrating the guide rail secured to the operator's compartment and arranged for vertical movement in a guideway mounted adjacent to the shuttle car side wall.
Figure 4:
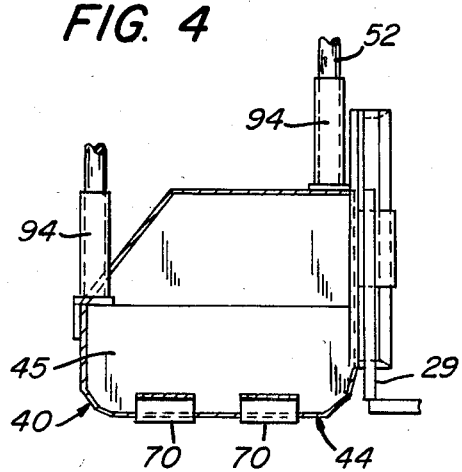
FIG. 4 is a sectional view taken along 4—4' of FIG. 3, illustrating the guide rail arranged for vertical movement in the recess portions of the guideway.
Figure 5:
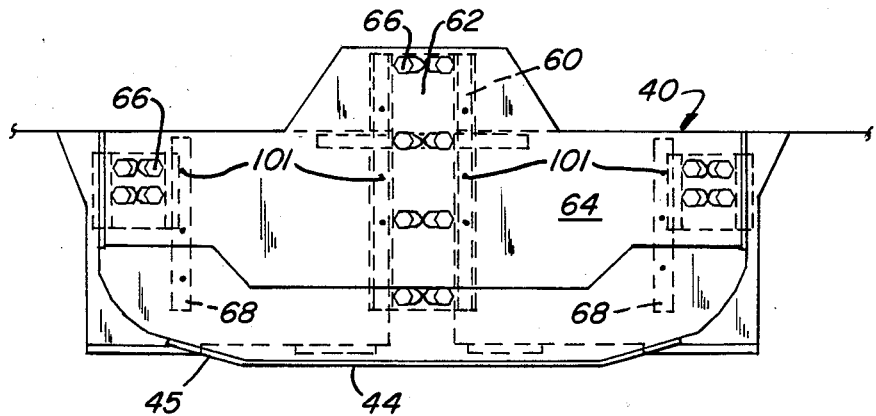
FIG. 5 is a sectional view taken along line 5—5' of FIG. 3, illustrating the positioning of the guide rail in the guideway that are bolted to the side wall of the shuttle car.

Referring to the drawings and particularly to FIGS. 1, 1A and 2 there is illustrated a mine haulage vehicle, such as a shuttle car, generally designated by the numeral 10 that includes a body portion 12 and a material receiving compartment 15 and a material discharge end portion 16. The body portion 12 is mounted on a pair of front traction wheels 18 and 20 and a pair of rear traction wheels 22 and 24. The wheels 18 and 24 are mounted adjacent to side walls 26 and 28 of the body 12 with the haulage compartment 14 extending therebetween. The haulage compartment 14 has a conventional endless flight conveyor 30 extending along its bottom portion.

The flight conveyor 30 includes a plurality of cross flights 32 that are propelled by suitable side chains (not shown). The discharge end of the conveyor 30 extends along a tiltable end frame 34 which is pivotally arranged to effect variations in the discharge height of the vehicle discharge end portion 16. The endless conveyor 30 is propelled by a pair of sprockets that are secured to a cross shaft which is propelled by a suitable prime mover.

The haulage vehicle or shuttle car 10 has adjacent the discharge end portion 16 and at one side of the material receiving compartment 15 a compartment 36 or 38 in which a traction motor (not shown) is positioned. A second traction motor, as desired, may be positioned on the opposite side of the haulage vehicle in a compartment 36 or 38 behind wheels 22 and 24. An operator's compartment generally designated by the numeral 40 is positioned adjacent the discharge end portion 16 (as shown) or between wheels 20 and 24 and is movably supported on the vehicle body portion in accordance with the present invention. The operator's compartment 40 serves as a station for the operator and has a suitable steering wheel 42 and the other necessary controls by which the vehicle may be operated and steered.

The preferred method of mounting the operator's compartment 40 of the present invention consists of a guide slot 60 formed within wall 29 which is supported by sidewall 28 of the mine vehicle. Mating within the guide slot 60 is rail member 62 which is rigidly attached to the rear wall 64 of the operator's compartment 40. In the preferred embodiment the rail 62 has a T-shaped cross section and is attached to the wall 64 by bolts 66.

In order to prevent galling and jamming between the guide slot 60 and the rail 62 clearences of $\frac{1}{4}''$ to $\frac{1}{2}''$ therebetween should be maintained. The guide and rail should be lubricated to reduce friction therebetween. Lubrication can be provided through grease fittings 101.

In order to ensure that no jamming or galling occurs the rail 62 must be located along the center line of the operator's compartment. This position along with the clearances set forth above minimize any binding when the compartment 40 falls after going over rough mine bottoms. Since the single track/guide rail combination has less tendency to jam it therefore provides an improved free floating platform over that of the prior art.

Auxiliary and safety brackets 72 are also included in the design to ensure that the operator's compartment stays attached to the vehicle should the rail 62 fail in a catastrophic manner. The safety brackets 72 are bolted onto the rear wall 64 of the operator's compartment 40 by additional bolts 66. In the preferred embodiment these brackets extend through slots in the wall 29 of the mine vehicle. The clearance between the slots 74 and the brackets 72 is sufficient so that no contact occurs therebetween during normal floating operation of the operator's compartment 40.

It can be seen that the entire operator's compartment can be removed from the shuttle car frame and body by removing the 16 cap screws or bolts 66 and disconnecting the appropriate hydraulic hoses and electric cable (not shown).

In the preferred embodiment various wear strips 68 are attached to the wall 64 to prevent contact and wear from occuring on the side wall 64. Also the bottom 44 of the operator's compartment 40 includes two wear strips 70 to increase the life of the bottom of the operator's compartment without unduly increasing the weight thereof.

With the operator's compartment 40 supported for vertical movement on the body portion 12 of the vehicle 10 in the manner above described, the bottom portion 44 remains in contact with the floor of the mine and consequently follows in a "floating" fashion the contour of the mine floor surface. With this arrangement of supporting the compartment 40 for vertical movement with respect to the vehicle side wall 28 additional clearance above the vehicle body portion 12 is provided for the installation of the overhead canopy 50. The overhead canopy functions to protect the vehicle operator positioned in the compartment 40 from the hazard of falling material disloged from the mine roof, as in the case of a roof fall. In addition as the shuttle car 10 operates in the mine to transfer the mined material out of the mine, the operator's compartment 40 moves vertically as the shuttle car moves over uneven portion of the mine floor. Movement of the compartment 40 on the mine floor is enhanced by the contoured edge portion 45 of the bottom portion 44. Thus, when the bottom portion 44 contacts the mine floor, the body portion 40 moves vertically on the vehicle body portion 12 in response to the undulations in the mine floor.

The vertical movement of the operator's compartment 40 on the vehicle body portion 12 is illustrated in FIG. 1A. With the bottom portion 44 positioned to travel on level portions of the mine floor, a change in the contour of the mine floor urges the operator's compartment 40 to rise and fall or float in response to the surface roughness of the mine floor. For example as illustrated in FIG. 1A, the tramming shuttle car 10 moves the compartment 40 with the bottom portion 44 in contact with a level portion 78 of the mine floor to an uneven portion 80 indicated by the dashed lines. The compartment 40 moves upwardly on the guide wall 29 as the bottom portion 44 advances from floor elevation 78 to floor elevation 80. Thus the compartment 40 resting on the mine floor additional overhead clearance is available for positioning the canopy 50 above the compartment 40.

In the preferred embodiment the bottom portion 44 of the operator's compartment has rounded and contoured edges 45 with a flat bottom to reduce resistance between the compartment and the floor and to digging or scrapping action especially in the turns.

By rigidly securing the compartment to the vehicle body portion in the conventional manner it is not possible to install a protective canopy on the compartment because of the limited overhead clearance that would exist between the top of the canopy and the mine roof. However, with the present invention additional overhead clearance is provided by positioning the compartment 40 for vertical movement on the shuttle car 10. When the compartment bottom portion 44 contacts the uneven surface of the mine floor, the body portion 40 rises but the upper surface of the canopy 50 remains spaced from the mine roof, as for example, when the compartment transverses from floor elevation 78 to floor elevation 80 because the body portion is vertically movable. With a conventionally mounted operator's compartment rigidly fixed on the vehicle, however, the top of the canopy would be jammed against the mine roof when the vehicle moves over uneven portion of the mine floor, particularly when opeating in mines having a mineral seam height of less than 40 inches. By movably supporting the operator's compartment 40 on the vehicle body portion 12 as described hereinabove, additional clearance is provided between the top of the canopy 50 and the mine roof because the operator's compartment always rests on the mine floor to permit vertical movement of the compartment 40 without the canopy 50 striking the mine roof.

To effect variations in the height of the canopy above the body portion 12 of the vehicle 10, the vertical members 52 that support the overhead canopy 50 are vertically movably on supports 94 that are secured to the opposite corners of the front and rear walls 49 and 51 of the compartment 40. Each of the vertical members 52 includes a vertical row of spaced apertures 96. A selected one of the apertures of each member 52 are aligned with an aperture extending through the corresponding support 94. With the selected one of the vertical member apertures 96 the relative position of the canopy 50 is then fixed by extending a suitable connecting means such as a bolt 100 through the aligned apertures and securing it by a nut to inmovably secure the vertical members 52 to the corresponding supports 94. With this arrangement the canopy 50 may be raised and lowered through a vertical range to permit variations in the vertical height between the canopy 50 and the bottom 44 of the compartment 40. Accordingly when operating in mines of lower mineral seam height, the canopy 50 may be lowered to permit vertical movement of the operator's compartment 40 on the vehicle body portion without striking the mine roof.

Accordingly to the provisions of the Patent Statutes, we have explained the principle, preferred construction and mode of operation of our invention and have illustrated and described what we now consider its best embodiments. However, it should be understood that, within the scope of the appended claims, the invention may be practiced otherwise than as specifically illustrated and described.

We claim:

1. A suspension system for the operator compartment of a mine vehicle having a body, said compartment attached to a side wall of said vehicle body, said compartment capable of free floatation with respect to said body as said vehicle traverses said mine floor, said compartment having a rear wall adjacent said body side, said system comprising:

a vertically extending guide means in said side wall of said body of said vehicle; and a single vertically extending rail structure for providing the sole guide and support of said operator compartment in said guide means, said rail structure centrally located on said rear wall of said operator's compartment, said rail structure allowing vertical sliding movement of said operator's compartment within said guide means as said compartment traverses said mine floor independent of the vertical movement of said vehicle body.

2. A suspension system for an operator's compartment as set forth in claim 1 wherein said body of said mine vehicle has an auxiliary support structure extending from said rear wall of said operator's compartment through said side wall. at each end of said operator's compartment; wherein said auxiliary support structure support said compartment only upon failure of said centrally located rail structure.

3. A suspension system for the operator compartment of a mine vehicle as set forth in claim 1 wherein said rail structure is a T-shaped structural member extending into said guide means in said body, said T-shaped member fixedly attached to said operator's compartment for vertical movement therewith.

4. A suspension system for an operator's compartment of a mine vehicle as set forth in claim 3 wherein the clearance between said guide means and said T-shaped support member is between ¼ inch and ½ inch to minimize binding there between when said operator's compartment is subjected to external loads.

5. A vehicle comprising:
a body;
an operator's compartment positioned adjacent said body, said compartment mounted to contact the surface on which said vehicle traverses; and
a single connecting means located on the central portion of said operator's compartment to said body, said connecting means providing the sole guide and support between said operator's compartment and said body, said connecting means arranged to permit movement of said operator's compartment in response to the forces imparted by said surface on said operator's compartment in a vertical direction relative to said body independently of the vertical movement of said body.

6. An improved vehicle of the type having a body, and operator's compartment attached to the side wall of said vehicle body for free floatation with respect thereto as said vehicle traverses a mine floor, said compartment having a rear wall thereof positioned adjacent said side wall of said body, said operator's compartment mounted to contact a mine floor and capable of moving in a vertical direction relative to said body independently of the vertical movement of said body as said compartment traverses said mine floor, the improvement comprising:
a vertically extending guide means in said side wall of said body of said vehicle; and
a single vertical rail capable of sliding mating engagement within said guide means, said vertical rail centrally located on said rear wall of said operator's compartment, said rail and said guide means providing the sole guide and support between said operator's compartment and said body during normal operation.

* * * * *